United States Patent
Coburn et al.

(10) Patent No.: US 6,792,891 B1
(45) Date of Patent: Sep. 21, 2004

(54) HUMMINGBIRD FEEDER

(76) Inventors: Joseph David Coburn, 504 Washington St., Pepin, WI (US) 54759; Joel Ralph Bernhardt, N1227 Basswood La., Pepin, WI (US) 54759

(*) Notice: Subject to any disclaimer, the term of this patent is extended or adjusted under 35 U.S.C. 154(b) by 0 days.

(21) Appl. No.: 10/649,415

(22) Filed: Aug. 26, 2003

Related U.S. Application Data

(60) Provisional application No. 60/407,632, filed on Sep. 3, 2002.

(51) Int. Cl.$^7$ ................................................ A01K 7/00
(52) U.S. Cl. ...................................... 119/72; 119/57.8
(58) Field of Search ............................... 119/69.5, 52.2, 119/57.8, 72, 72.5, 77, 78, 79, 80

(56) References Cited

U.S. PATENT DOCUMENTS

| | | | |
|---|---|---|---|
| 2,878,781 A | * 3/1959 | Otto ............................. 119/72 |
| 4,630,569 A | * 12/1986 | Dieleman ..................... 119/69.5 |
| 4,980,990 A | 1/1991 | Hiday |
| 5,062,390 A | * 11/1991 | Bescherer et al. ............ 119/72 |
| 5,247,904 A | 9/1993 | Anderson |
| 5,450,816 A | 9/1995 | Santa Cruz |
| 5,454,348 A | 10/1995 | Colwell et al. |
| 5,678,600 A | 10/1997 | Locke et al. |
| 5,743,212 A | * 4/1998 | Forjohn ........................ 119/69.5 |
| 5,743,290 A | * 4/1998 | Locke et al. ................. 137/403 |
| 5,784,998 A | * 7/1998 | Manzer ....................... 119/69.5 |
| 5,918,415 A | * 7/1999 | Locke et al. .................... 47/79 |
| 5,924,382 A | * 7/1999 | Shumaker ...................... 119/72 |
| 5,947,054 A | * 9/1999 | Liethen ....................... 119/57.9 |
| 5,966,868 A | * 10/1999 | Cox ............................. 47/66.6 |
| 5,988,601 A | * 11/1999 | Burgess ...................... 261/34.1 |
| 6,079,951 A | * 6/2000 | Morton ......................... 417/40 |
| 6,318,290 B1 | 11/2001 | Fisher |
| 6,463,878 B1 | * 10/2002 | Moody ....................... 119/57.9 |
| 6,499,430 B2 | 12/2002 | Garcia-Lucio et al. |
| 6,553,936 B2 | * 4/2003 | Sasso ........................... 119/72 |
| 6,659,041 B1 | * 12/2003 | Curts ......................... 119/52.2 |
| 2001/0029899 A1 | 10/2001 | Arlitt |

FOREIGN PATENT DOCUMENTS

SU 1395236 * 5/1988

* cited by examiner

*Primary Examiner*—Peter M. Poon
*Assistant Examiner*—David J Parsley
(74) *Attorney, Agent, or Firm*—M. Paul Hendrickson

(57) ABSTRACT

The present invention provides a self cleaning humming bird feeder equipped to protectively store sugared nectar and contaminated feed tank from insect infestation. The feeder including a feeding cup jacketed within a contaminated feed trap emptying onto a contaminated feed holding tank, a feed reservoir and a pump for pumping nectar to the feeding cup. Cleansing of the feed cup may be accomplished by pumping and overflowing excess sugared nectar into the feed cup causing it to spill over with contaminates onto the contaminated feed trap.

12 Claims, 6 Drawing Sheets

HUMMINGBIRD FEEDER

This application is a non-provisional application of earlier filed provisional application No. 60/407,632 entitled "Humming Bird Feeder", filed on behalf of Joseph David Coburn and Joel Ralph Bernhardt on Sep. 3, 2002.

FIELD OF THE INVENTION

The present invention relates to bird feeders and more particularly to a hummingbird feeder and its use.

BACKGROUND OF THE INVENTION

It is difficult (if not impossible) to maintain a feeding cup in a hummingbird feeder free from contaminates. Insects, wind blown debris and other undesirable materials contaminate the feed source so that it becomes unsightly, as well as being unhealthy to the feeding birds. In many instances, the contamination also contaminates the feed reservoir. The Patent literature abounds with alleged solutions to the contamination problems with bird feeders. For example, U.S. Pat. No. 4,980,990 to Hiday discloses a insect trap used in combination with a bird feeder having a water barrier to cut off insect infestation into the bird feeder. The Hiday patent trap includes a water receiving cavity having a base wall, a side wall and a stem with a means for positioning the insect trap between a hanger and the bird feeder so as to prevent movement of insects beyond the trap. U.S. Pat. No. 5,247,904 to Anderson discloses a hummingbird feeder having a divider wall and support posts which support the hummingbird feeder and prevent crawling insects from accessing into the surrounding body of fluid. In U.S. Pat. No. 5,450,816 to Santa Cruz, there is disclosed a tubular design for a humming bird feeder with a limited capacity fluid chamber so as to prevent spoilage of a water/sugar solution. In another patent, U.S. Pat. No. 5,454,348 to Colwell, et al, there is disclosed a hummingbird feeder having a top wall, a bottom wall, and the top and bottom walls join at the ends to create an enclosure for a reservoir. The feeder is provided with a cleaning opening which is large enough to facilitate cleaning of the reservoir, and a removable cap for cleaning the opening. U.S. Pat. No. 6,318,290 B1 to Fisher discloses an automatic bird feeder and waterer which contain both a food and a water reservoir for supplying food and water in dispersed portions. Another U.S. Pat. No. 6,499,430 B2 to Garcia-Lucio, et al discloses a feeding tube used with a hummingbird feeder having a design of a imitation flower. Additionally, U.S. Pat. No. 6,553,936 B2 to Sasso discloses a hummingbird feeder that includes a storage vessel for fluid, such as nectar, and an attached portion for feeding. Lastly, U.S. pat. application Ser. No. 2001/0029899 to Arlitt discloses a hummingbird feeder which may be disassembled for cleaning.

None-the-less, there still exists a need for a liquid bird feeder, such as a hummingbird feeder, which may be readily cleansed of undesirable debris and insect infestation by mechanical flushing of the contaminates therefrom without requiring manual intervention into the feeding cup or feeding reservoir.

SUMMARY OF THE INVENTION

The present invention provides a liquid bird feeder which may be readily cleansed by flushing unwanted debris and contaminates from a feeding cup. The hummingbird feeder includes a feed reservoir for retaining a liquid feed reserve (such as a sugared nectar) essentially protected from insect penetration, a feeding cup from which the bird may feed upon the liquid feed, a pump for pumping the liquid feed from the feed reservoir to the feeding cup and an overflow trap positioned so as to capture undesirable contaminates which are flushed from the feeding cup by overflowing the feeding cup with the liquid feed. Cleansing of the feeding cup may be accomplished by pumping excess liquid feed into the feeding cup causing an overrun of liquid feed laden with contaminates onto the overflow trap. The hummingbird feeder of the present invention also provides a method for flushing liquid feed contaminates and debris from the hummingbird feeding cup by pumping liquid feed to the feeding cup causing the contaminates to overflow from the feeding cup and run onto the overflow trap.

DETAILED DESCRIPTION OF THE INVENTION

Figure 1:
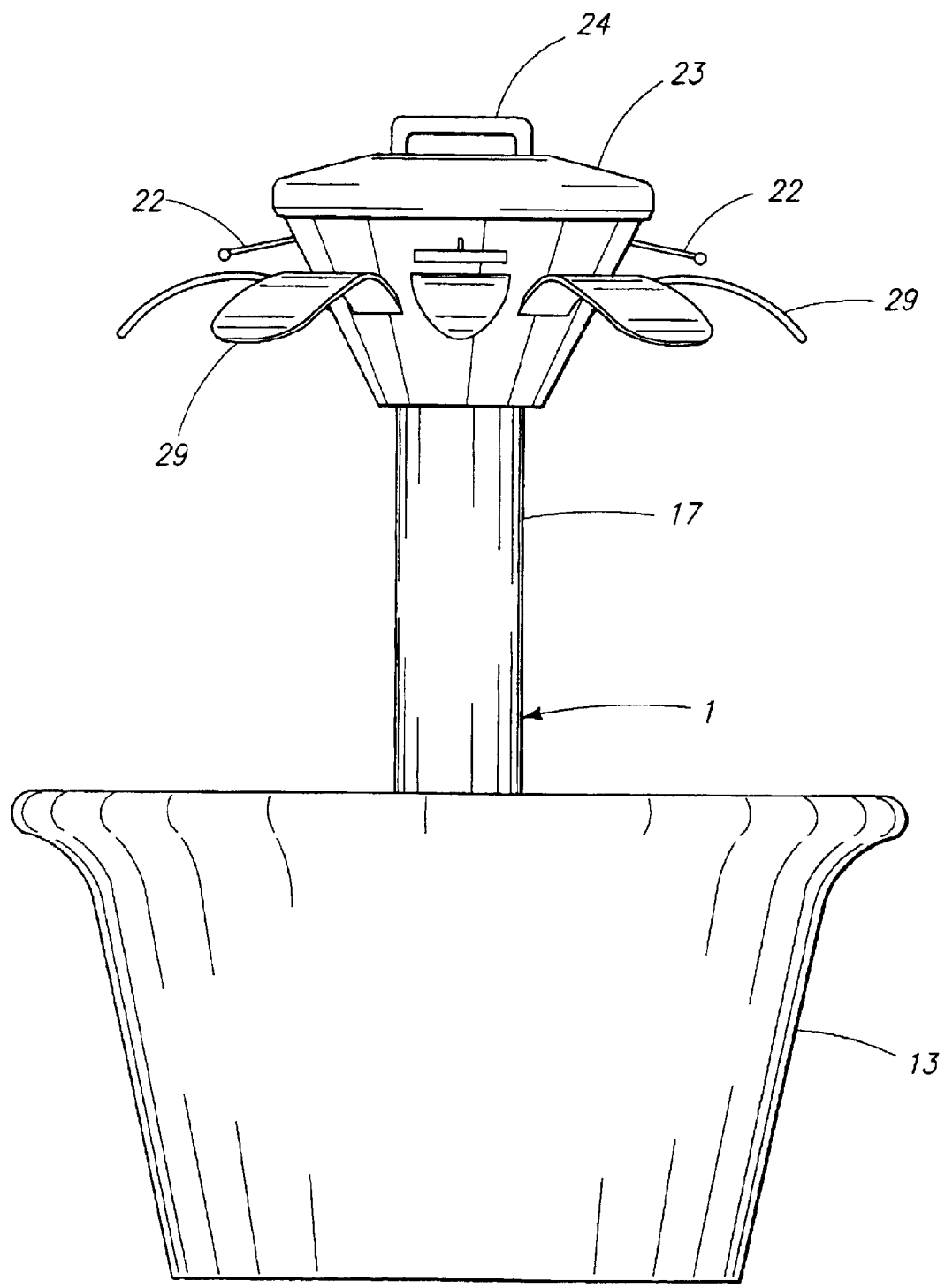
FIG. 1 is a side view of a hummingbird feeder of this invention.

With references to the accompanying Figures, the present invention provides a hummingbird feeder 1 comprised of a feed reservoir 3 for retaining liquid feed F, a feeding cup 5 for feeding the liquid feed F to a feeding bird (not shown), a pump 7 for pumping the liquid feed F from the feed reservoir 3 to the feeding cup 5 and an overflow trap (generally identified as 9) positioned so as to capture the feed contaminates X flushed from the feeding cup 5 by pumping excess liquid feed F into the feeding cup 5 causing a feed F overrun. With reference particularly to the figures, the basic operating features of the hummingbird feeder 1 includes a feed reservoir 3 for a sugared solution F, a pump 7, a conduit (generally identified as 11) for pumping the sugared solution F to the feeding cup 5 and an overflow trap (generally referred as 9). The bird feeder 1 as depicted by FIGS. 1–4 portrays a potted plant container 13 simulating a plant pot which serves not only as a supportive base but also as a holding container or housing for feed reservoir 3 containing the sugared water feed supply F and as a housing overflow trap tank 33 for holding or retaining the overflow contaminates X. A protective pot covering lid 14 rests upon rims 18 of the plant pot 13 to securely retain both the sugared solution and overflow contaminates from external invasion. Internally, the simulated pot 13 includes a socketed post 15 for posting waste return column 17 which in turn serves as waste conduit for overflow trap 9.

Pumping means 7 for pumping feed F to the feeding cup 5 may be any type of pump (e.g. mechanical, electrical, hydraulic, etc.) capable of pumping fluid feed F from the reservoir 3 to the feeding cup 5. A reed pump or bulb primer such as commonly used for the priming of small internal combustion motors and outboards or a manual hand pump equipped with a ball and check valve as commonly used to pump liquid soaps, hand lotions, etc., from an enclosed container are cost effective and may be effectively utilized for this purpose. Similarly, a rubber bulb hand pump fitted with a check valve or alternatively, a power operated mechanical pump equipped with a sensing means to regulate the flow of sugared solution to the feeding cup 5 may also be utilized for this purpose. If desired, electronic pumps fitted with pumping sensors such as a light sensor, time delayed feed cup capacity sensors to detect feed levels etc. may likewise be used to trigger the supply pumped feed F to the feed cup 5.

In the feeder shown in FIGS. 1–4, plastic conduits 11B & 11A positioned before and after pump 7 are used to conduct the pumped fluid F to the funneled shaped feeding cup 5 from feed reservoir 3. It will be observed from FIG. 2 that the feed conduit 11A is housed within the return trap conduit 17 and is attached to the feed end of the funnel shaped sugared water solution feeding cup 5. The funnel shaped feeding cup 5 is jacketed by a funnel shaped trap jacket 15A (which is an over-all part of trap 9) and may seated by two or more ribs 19 (two shown and two occluded from view) adapted to separate the funnel shaped jacket 15A from the feeding cup 5 so as to permit the overflow of contaminates from the feeding cup 5 to the waste return trap conduit 17. A closing lid 23 (e.g. snap-on, threaded, etc.) having a periphery flanged lip 25 secures onto a lipped rim 26 of jacket 15A to provide a closed feeding system with feeding access porting through the feeding holes 27 of lid 23. The lid 23 includes a lid handle 24 for easy access and removal. Feeding lid 23 also may be designed to simply screw or twist on or off the jacketed trap 15A or snap-on. As illustrated in FIGS. 1–4, feeder 1 may be appropriately decorated with flower shaped pedals 29 to provide a decorative flower configuration. If desired, a feeding post 22 for posting the bird may be optionally included. The exploded cross-sectional view of the funnel jacket 15A and feeder cup 5 of FIG. 4 with lid 23 removed shows in greater detail the feeding cup 5 with feed conduit 11 surrounded by funnel shaped trap jacket 15A and trap return column 17 of overflow trap 9. Funnel shaped trap jacket 15 includes an apertured base 15B which allows overflow contaminates to flow into return trap conduit 17.

Figure 2:
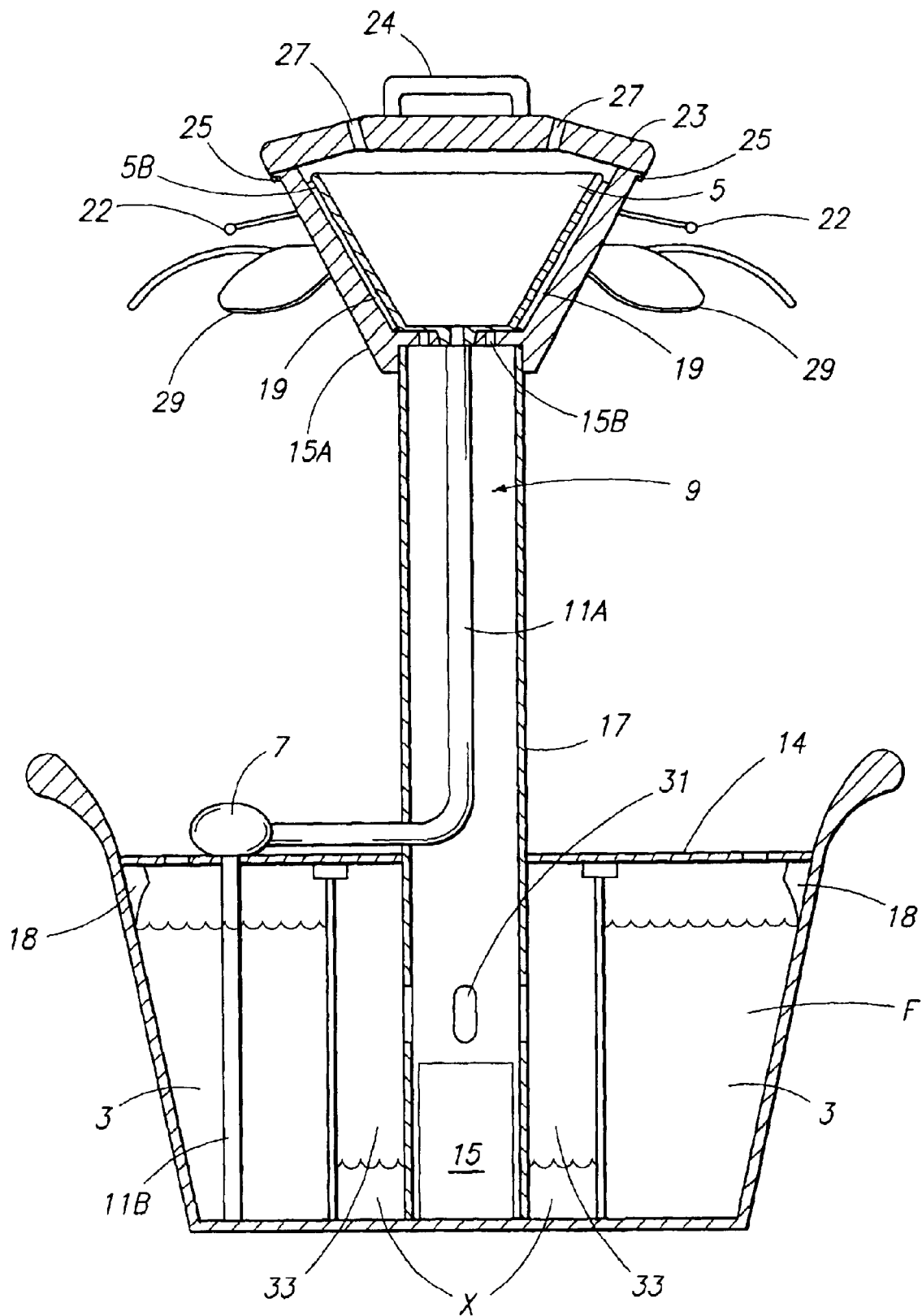
FIG. 2 is a vertical bisectional view of the feeder shown in FIG. 1.
Figure 3:
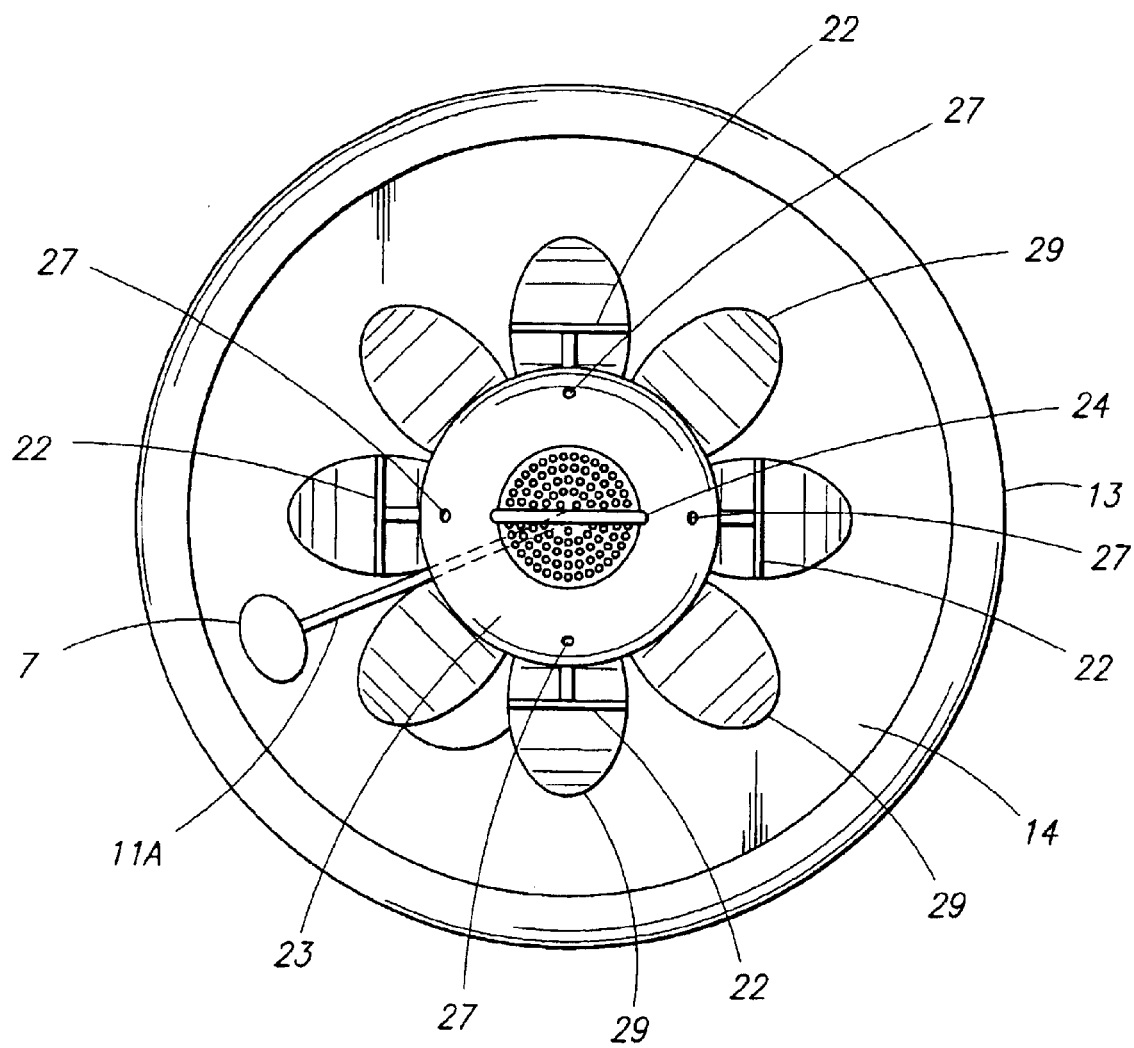
FIG. 3 is a top view of the feeder shown in FIG. 1.
Figure 4:
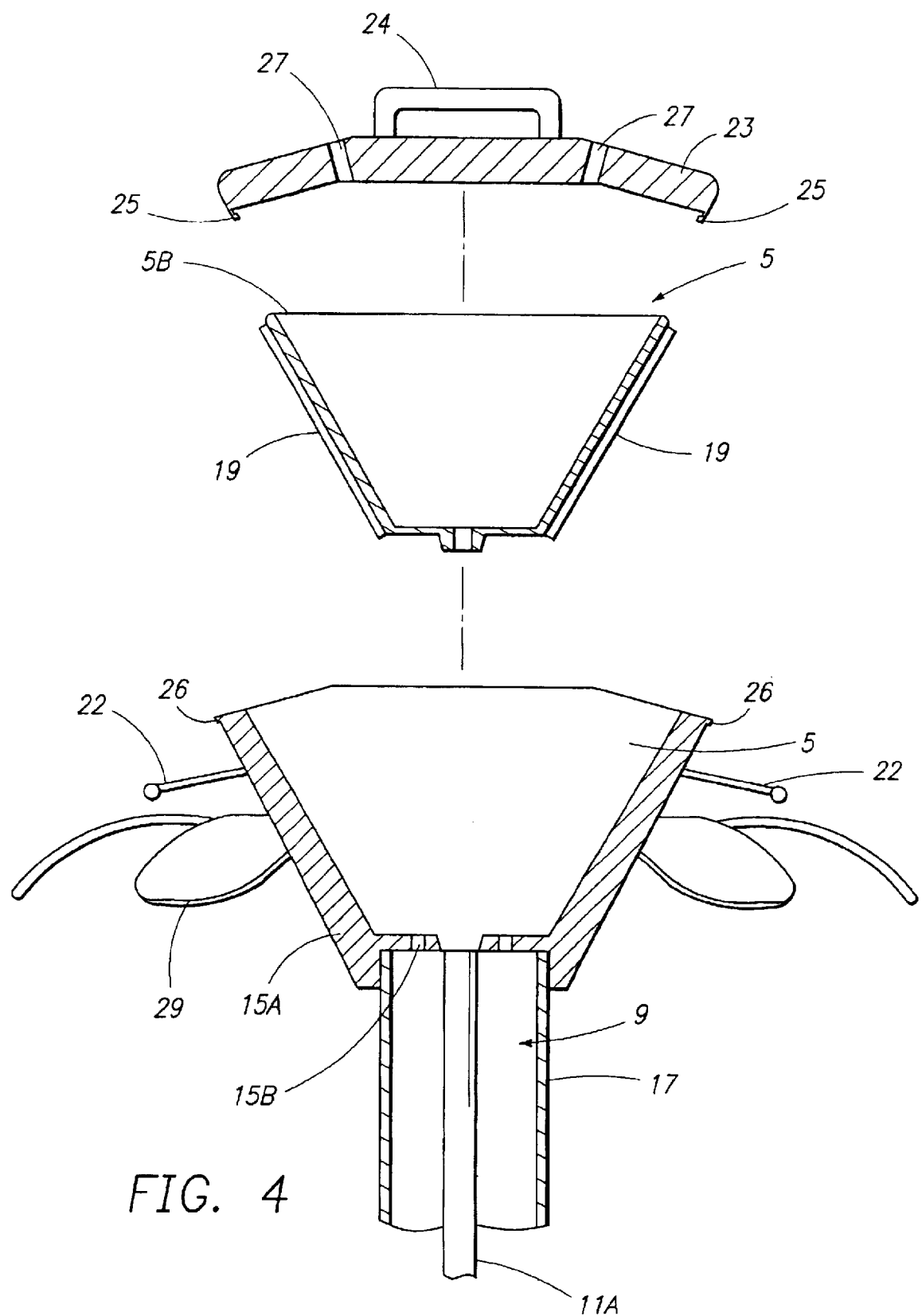
FIG. 4 is an enlarged and exploded cross sectional view of the upper portion of the bird feeder shown in FIG. 2.
Figure 6:
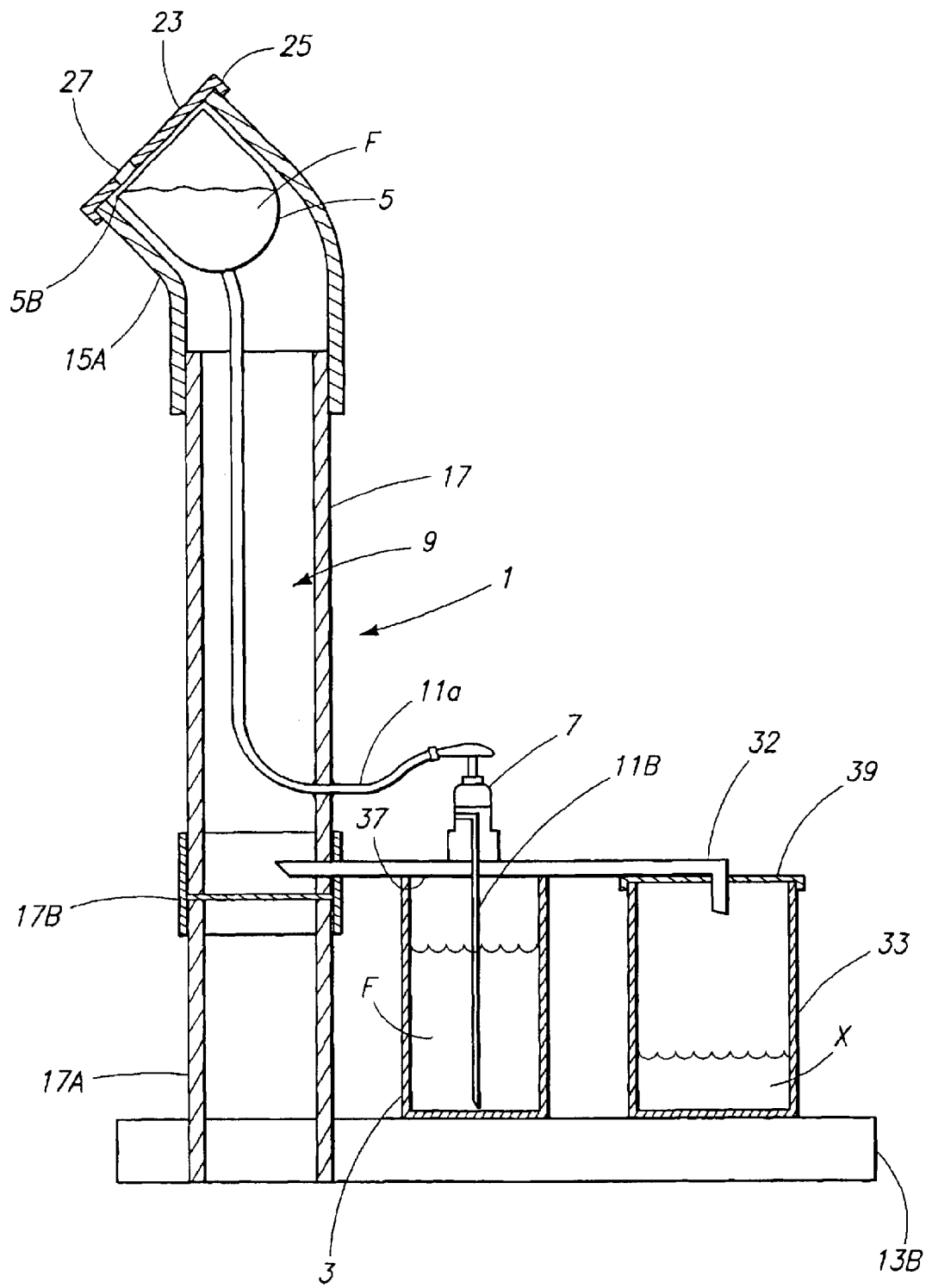
FIG. 6 is a bisectional view of FIG. 5.

The overflow trap 9 features of feeder 1 may be better understood by referring in particular to FIGS. 2, 4 & 6. As may be observed from FIGS. 2 & 4, the funnel shaped feeding cup 5 is concentrically housed within funnel shaped jacket 15A with the feeding cup brim 5B being positioned below feeding lid 23 so as to permit an overflowing of contaminated feed X onto jacket 15A by the pumping of excess feed F into feed cup 5. As may be further visualized from FIGS. 2 & 4, the overflowing feed F gravitationally overflows onto funnel shaped jacket 15A which then funnels the overflow contaminates X into return trap conduit 17 which in turn leads onto trap ports 31 porting onto contaminant trap tank 33. When it is desired to either remove and clean the overflow (rap tank 33 or add fresh feed reservoir 3, the pump 7 may be separated from the conduit 11B and waste return column 17 from post jacket 1S allowing for the removal of covering lid 13, thus providing access to both contaminant trap tank 33 and the food reservoir 3.

With particular reference, the FIG. 6 cross-sectional view shows a feeder 1 which differs in appearance but functions in the similar manner to feeder 1 of FIGS. 1–4. Excess feed (F) is pumped with pump 7 from mesh feed reservoir 3 through feed conduit 11a causing feeding cup 5 to overflow, spilling excess feed onto angled trap jacket 15A which guides the spilled and usually contaminated feed onto trap column 17 which is supported by waste column support 17A. The trapped contaminates of spilled feed Is piped from trap column 17 through contaminate discharge pipe p 32 which discharges the contaminated feed into waste discharge tank 33.

Figure 5:
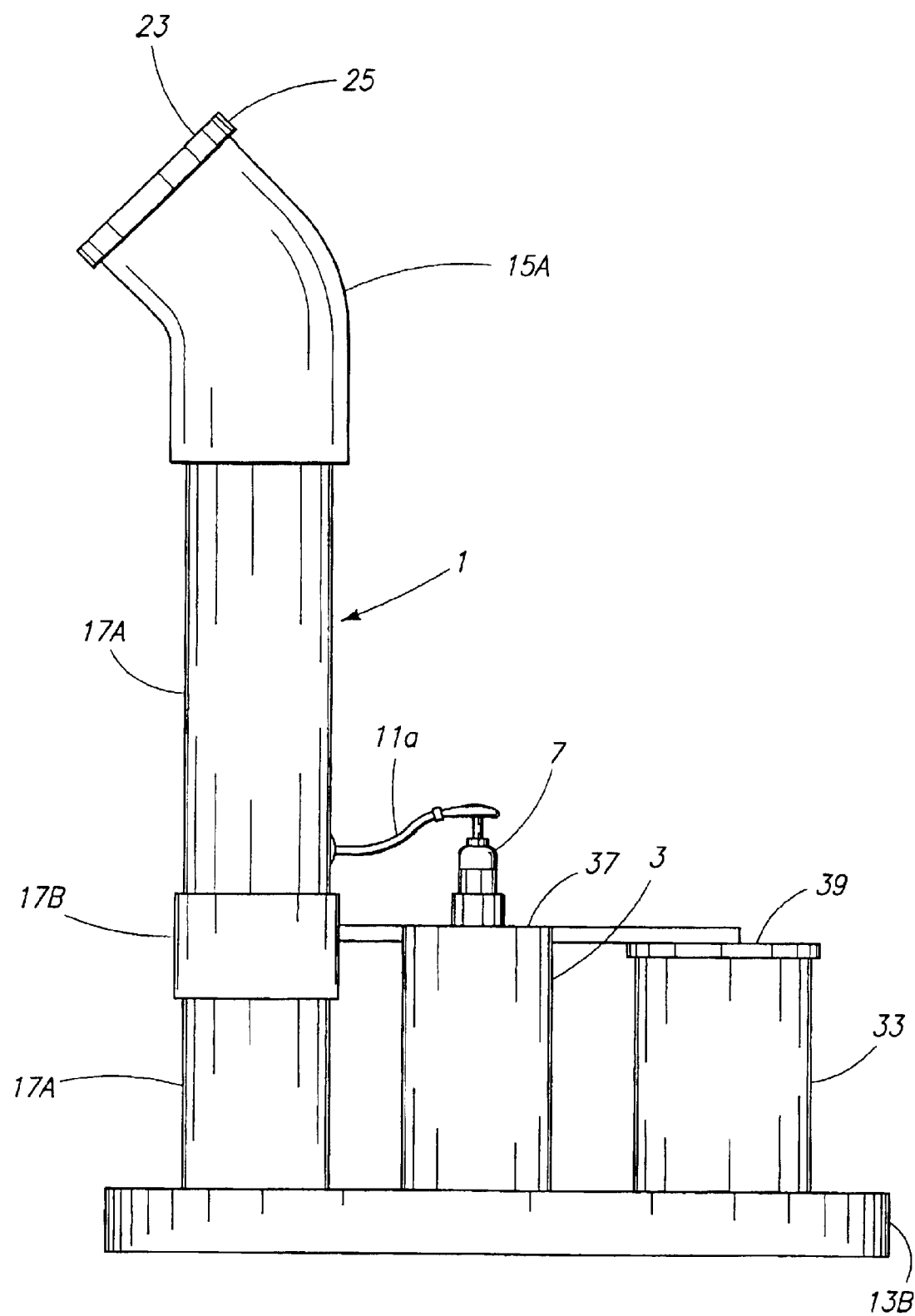
FIG. 5 is a side view depicting another embodiment of the bird feeder shown in FIG. 1.

The feeder 1 as depicted in FIGS. 5 & 6 basically embodies the same overflow features of the feeder 1 shown in FIGS. 1–4. The feeder 1 similarly includes what is shown as a supportive base 13B depicted as a flat base (as opposed to the plant pot 13 support base of FIGS. 1–4) which serves as a base 13B for feeder 1. Similar to the FIGS. 1–4 feeder 1, the feeding cup 5 is housed within overflow trap 9 as shown in FIGS. 1–4.

The base 13B supports the waste contaminant tank 33, the cot reservoir 3 and trap return column 17 which serves as a mount for the feeding cup 5 and collector for overflow trap 9. With particular reference to FIG. 6, it will be observed that the feeding cup 5 is also housed within the contaminate overflow trap 9 is bordered at the initial waste collecting site by an angular pipe tube 15A such as a pipe fitting equipped with a lid 23 having a lip 25 and a feeding orifice 27 positioned so as to provide access to the feeding cup 5 by the feeding bird. Similar to the overflow tributes of the FIGS. 1–4 feeder, the feeding cup 5 is housed within the waste return column 17 with a feeding brim 5B positioned so as to allow the overflow feed to flow into trap collector 15A of the overflow trap housing 9. Trap column 17 serves dually to house the feed conduit 11a and as the waste return. As may be further observed, the waste return column 17 includes a coupling stop barrier 17B which collects the overflow contaminates for transfer onto waste conduit 32 to waste tank 33.

The illustrated pump 7 of FIGS. 5–6 may be of the type commonly utilized to dispense in common household soaps and hand lotions wherein the user simply manually pumps by hand the fluid feed F from the feed reservoir 3 through the feed conduits 11A & 11B onto feed cup 5. Base 13B is grooved or bored so as to receive waste column support 17A coupled onto waste column return 17 with coupling stop barrier 17B. The feed reservoir 3 and the contaminant trap tank 33 are equipped with lids 37 & 39 to seal tanks 3 & 33 from infestation by insects which respectively mate onto the pump conduit 11B and feed reservoir 3 and the waste return conduit 32 to waste tank 33. In the same fashion as FIGS. 1–4, pumping pump 7 provides excess fluid to the feeding cup 5 causing the feeding cup liquids to overflow therefrom and return through the trap system 9 of the invention to contaminant tank 33.

The feeders 1 of FIGS. 1–6 may be constructed of commonly available materials. Commonly available pipe fittings may be utilized to create the feed reservoir 3 and the holding tank trap 9 for the FIGS. 5 and 6 feeder. Accordingly, commonly available plastic conduits, pumps etc. may be readily adapted to the feeder 1 construction.

What is claimed is:

1. A hummingbird feeder comprising a feed reservoir for retaining liquid feed, a feeding cup, an overflow trap having an overflow trap jacket jacketing the feeding cup, and a lid having a feeding orifice protectively positioned so as to provide lid protectively covering said feeding cup and said overflow trap jacket, a pump for pumping the liquid feed form the feed reservoir to the feeding cup with the overflow trap jacket being positioned so as to capture feed contaminates flushed from the feeding cup by pumping excess liquid feed from feed reservoir into the feeding cup causing the feed contaminate within the feeding cup to overrun and drain onto the overflow trap jacket.

2. The feeder according to claim 1 wherein the feeding cup is positioned entirely within the overflow trap jacket and the overflow trap jacket funnels the feed contaminates onto a contaminate trap tank for containing feed contaminates flushed from the feeding cup.

3. The feeder according to claim 1 wherein feeding ports positioned above a brim of the feeding cup provides feeding access to the feeding hummingbird.

4. The feeder according to claim 2 wherein a conduit for feeding pumped liquid feed to the feeding cup is housed within the overflow trap jacket.

5. The feeder according to claim 3 wherein the liquid feed and the overflow trap jacket for capturing the feed contaminates are protectively housed within the feeder and thereby protected from insect intrusion.

6. The feeder according to claim 5 wherein the feed reservoir and the overflow trap tank are protectively covered by a removable lid for accessing thereto.

7. The feeder according to claim 1 wherein the pump comprises an externally disposed hand operated pump for pumping the liquid feed to the feeding cup.

8. A method for flushing liquid feed contaminates from a hummingbird feeder equipped with a liquid feed reservoir, a feeding cup and overflow trap inlet covered by a lid having a feeding orifice position so as to provide a feeding hummingbird access to the liquid feed contained within the feeding cup, a pump for pumping the liquid feed to the feeding cup from said reservoir with the overflow trap inlet being positioned so as to capture contaminates flushed from said feeding cup, said method comprising:

a) pumping liquid feed to the feeding cup with said pump, b) allowing the liquid feed to become contaminated with contaminates, and c) flushing the contaminants from said feeding cup by pumping excess liquid feed into the feeding cup so as to cause the contaminates to overflow the feeding cup onto the overflow trap inlet and thereby flush the contaminants from the feeding cup.

9. The method according to claim 8 wherein the pump for pumping includes manually pumping excess fluid into the feeding cup with a hand operated pump and the overflow trap inlet funnels the flushed contaminants trap tank for containing the flushed contaminates.

10. The method according to claim 9 which includes a replenishing of the feed reservoir with liquid feed.

11. The method according to claim 9 wherein the overflow trap inlet is comprises an overflow trap funnel essentially housed within the feeder and the contaminate trap tank includes an accessing port for removal of contaminates from the contaminate trap tank and, said method includes the additional step of removing feed contaminates from the overflow trap tank.

12. The method according to claim 9 wherein the feed liquid is stored within a feed reservoir protectively housed within the feeder and the overflow trap tank for storing overflow contaminates includes a contaminate container protectively housed within the feeder and the method includes accessing the contaminate container and removing contaminates while replenishing the feed reservoir with added liquid feed.

* * * * *